United States Patent
Bomal et al.

(12)

(10) Patent No.: US 6,245,834 B1
(45) Date of Patent: Jun. 12, 2001

(54) USE OF A COMBINATION OF SILICONE COMPOUNDS AS A COUPLING AGENT IN SILICA-LOADED ELASTOMER COMPOSITIONS

(75) Inventors: Yves Bomal, Paris; Olivier Durel, Cebazat, both of (FR)

(73) Assignee: Rhodia Chimie, Boulogne Billancourt Cedex (FR)

( * ) Notice: Subject to any disclaimer, the term of this patent is extended or adjusted under 35 U.S.C. 154(b) by 0 days.

(21) Appl. No.: 09/101,320

(22) PCT Filed: Jan. 9, 1997

(86) PCT No.: PCT/FR97/00037

§ 371 Date: Jul. 7, 1998

§ 102(e) Date: Jul. 7, 1998

(87) PCT Pub. No.: WO97/25374

PCT Pub. Date: Jul. 17, 1997

(30) Foreign Application Priority Data

Jan. 11, 1996 (FR) .................................................. 96 00440

(51) Int. Cl.$^7$ ............................. C08K 9/06; C08L 83/08; C08G 77/28
(52) U.S. Cl. ......................... 523/213; 525/100; 525/104; 525/105; 525/106; 525/342; 528/25; 528/26; 528/28; 528/33; 528/34
(58) Field of Search ................................. 528/34, 25, 26, 528/28, 33; 525/100, 104, 105, 106, 342; 523/213

(56) References Cited

U.S. PATENT DOCUMENTS

| | | | | |
|---|---|---|---|---|
| 3,872,054 | * | 3/1975 | Shaw | 528/34 |
| 3,956,209 | * | 5/1976 | Hamilton, Jr. et al. | 528/34 |
| 6,033,597 | * | 3/2000 | Yatsuyanagi et al. | 252/182.17 |

\* cited by examiner

*Primary Examiner*—Robert Dawson
*Assistant Examiner*—Jeffrey B. Robertson
(74) *Attorney, Agent, or Firm*—Jean-Louis Seugnet

(57) ABSTRACT

Use of an effective amount of a specific combination of silicone compounds comprising the combination:

of at least one functionalized polyorganosiloxane (abbreviated as POS) containing, per molecule, at least one functional siloxy unit (abbreviated as UN1) capable of binding chemically and/or physically with the hydroxylated surface sites of the silica particles, and of at least one functionalized organosilane (abbreviated as OS) containing, per molecule, at least one functional group (abbreviated as G1) capable of binding chemically and/or physically with the UN1 units and/or the hydroxylated sites of the silica particles and at least one other functional group (abbreviated as G2) capable of binding chemically and/or physically to the elastomer chains, as silica/elastomer coupling agent in the natural or synthetic elastomer compositions comprising a siliceous material as reinforcing filler intended for the manufacture of an article made of elastomer(s).

18 Claims, No Drawings

USE OF A COMBINATION OF SILICONE COMPOUNDS AS A COUPLING AGENT IN SILICA-LOADED ELASTOMER COMPOSITIONS

This application is an application under 35 U.S.C. Section 371 of International Application Number PCT/FR97/00037, filed on Jan. 9, 1997.

The area of the present invention is that of the use of a specific combination of silicone compounds as silica/elastomer coupling agent in natural or synthetic elastomer compositions comprising a siliceous material as reinforcing filler. The invention also relates to the elastomer compositions obtained by virtue of the employment of an effective amount of the said combination of silicone compounds and to the processes for the preparation of these compositions. It also relates to the articles made of elastomer(s) with a body comprising the abovementioned compositions.

The types of articles made of elastomer(s) where the invention is most useful are those subject in particular to the following stresses: high frequency loading variations and/or temperature variations under dynamic conditions; and/or a high static stress; and/or a high flexural fatigue under dynamic conditions. Types of articles are, for example: conveyor belts, power transmission belts, flexible pipes, expansion joints, seals for domestic electrical appliances, supports which act to remove engine vibrations, either with metal frameworks or with a hydraulic fluid within the elastomer, spring components situated between the rigid articulated metal components of the caterpillar track of a vehicle in contact with the ground, cables, cable sheathings, shoe soles and rollers for cableways.

The area of the invention is that of a high-performance use capable of providing elastomer compositions which in particular exhibit, in order to meet the stresses of use spoken about above, an exothermicity under dynamic conditions (tan) which is as low as possible and, if possible, excellent mechanical properties, in particular good tear strength, resistance to abrasion and compression set (CS) values. Other properties which can be improved are, for example, the properties of resistance to water and to water containing washing powder of the vulcanisates resulting from certain elastomers.

To achieve such an objective, many solutions have been provided consisting in particular in modifying, inter alia, the nature of the elastomers on completion of polymerization by means of coupling or starring or functionalization agents.

All these solutions have essentially concentrated on the use of modified polymers with carbon black as reinforcing filler with the aim of obtaining a good interaction between the modified polymer and the carbon black. It is known, generally, that in order to obtain the optimum reinforcing properties conferred by a filler, it is advisable for the latter to be present in the elastomer matrix in a final form which is both as finely divided as possible and as homogeneously distributed as possible. Now, such conditions can only be produced insofar as, on the one hand, the filler exhibits a very good ability to be incorporated in the matrix during the mixing with the elastomer and to disaggregate or to deagglomerate and to disperse homogeneously in the elastomer. The use of white reinforcing fillers, and in particular of silica, has proved to be inappropriate due to the low level of certain properties of such compositions and consequently of certain properties of the articles in which these compositions are used.

Moreover, because of mutual affinity, the silica particles have an unfortunate tendency to agglomerate with one another in the elastomer matrix. These silica/silica interactions have the harmful consequence of limiting the reinforcing properties to a level substantially lower than that which it would be theoretically possible to reach if all the silica/elastomer interactions capable of being created during the mixing operation were actually obtained.

Moreover, the use of silica raises difficulties of use due to the silica/silica interactions, which tend, in the crude state, to increase the consistency of the elastomer compositions and in any case to make their use more difficult than the use of carbon black. Finally, the interactions between the silica and the crosslinking system, when it is based on sulphur, are disadvantageous to the rate and the yield of the crosslinking.

It is known to the person skilled in the art that it is necessary to use a coupling or binding agent which reacts with the silica in order to create good interactions between the surface of the silica and the elastomer and a true network between the elastomer chains, while facilitating the dispersion of the silica.

Thus, Patent U.S. Pat. No. 3,350,345 provides for the use of rubber compositions comprising silica, a hydrolysable silane and, in particular, a mercaptosilane as elastomer/silica coupling agent. Patent Application FR-A-2,094,859 provides for the use of rubber compositions comprising silica and a mercaptosilane as coupling agent for the manufacture of tire treads, due to the improved properties exhibited by such compositions. It was rapidly demonstrated and known by the person skilled in the art that mercaptosilanes, and in particular γ-mercaptopropyltrimethoxysilane and γ-mercaptopropyltriethoxysilane, were capable of providing the best silica/elastomer coupling properties but that the industrial use of these coupling agents often posed a problem, due to the high reactivity of the SH functional groups resulting very rapidly, during the composition preparation in an internal mixer, in premature vulcanizations, also known as "scorch", in very high Mooney plasticities and finally in compositions which are virtually impossible to work and to make use of industrially. For illustration of this difficulty in the industrial use of such coupling agents and the compositions containing them, mention may be made of Patent Application FR-A-2,206,330 and Patent U.S. Pat. No. 4,002,594.

To overcome this disadvantage, Patent Application FR-A-2,206,330 provides for the use, as coupling agent, of polysulphide organosilanes, including bis(3-triethoxysilylpropyl) tetrasulphide, which prove to result in the best compromise, for vulcanisates containing silica as filler, in terms of scorch safety, ease of use and reinforcing power. However, this coupling agent is very expensive and must be used in a relatively large amount, of the order of 2 to 3 times larger than the amount of γ-mercaptopropyltrimethoxysilane necessary to obtain equivalent levels of coupling properties.

Consequently, it thus appears desirable from an economic viewpoint to be able industrially to develop silica-reinforced elastomer compositions comprising low levels of coupling agents which have as good a performance as mercaptosilanes but while avoiding premature vulcanizations and problems of use related to an excessively high viscosity of the compositions.

An attempt in this direction has been described in Patent U.S. Pat. No. 4,74,908, which discloses the use, as coupling agents, of the mixture of a mercaptosilane and an alkoxysilane. However, this route does not satisfactorily overcome the problem of scorch and of use.

On considering the prior state of the art, it thus appears that there exists an unfulfilled requirement, in high-performance uses, for coupling agents based on silicone compounds in elastomer compositions comprising a siliceous material as reinforcing filler.

I—This object, among others, is achieved by the present invention, which relates more specifically, in a first subject, to the use:

→ of an effective amount of a specific combination of silicone compounds comprising the combination:
of at least one functionalized polyorganosiloxane (abbreviated as POS) containing, per molecule, at least one functional siloxy unit (abbreviated as UN1) capable of binding chemically and/or physically with the hydroxylated surface sites of the silica particles, and of at least one functionalized organosilane (abbreviated as OS) containing, per molecule, at least one functional group (abbreviated as G1) capable of binding chemically and/or physically with the UN1 units and/or the hydroxylated sites of the silica particles and at least one other functional group (abbreviated as G2) capable of binding chemically and/or physically to the elastomer chains,
→ as silica/elastomer coupling agent in the natural or synthetic elastomer compositions comprising a siliceous material as reinforcing filler intended for the manufacture of an article made of elastomer(s).
→ First subject of the invention:

POLYORGANOSILOXANES (POS):

The POS silicone compounds are preferentially chosen from the compounds (A) and their mixtures, the compounds (B) and their mixtures, the compounds (C) and their mixtures, and mixtures of the abovementioned species, where:

♦ (A) are compounds comprising, per molecule:
-α- on the one hand, at least one functional siloxy unit (UN1) of formula:

$(R)_a \, Y \, Si(O)_{3-\frac{a}{2}}$ (I)

in which
*$a=0$, 1 or 2,
*R is a monovalent hydrocarbon radical chosen from linear or branched alkyls having from 1 to 6 carbon atoms, in particular methyl, ethyl, propyl or butyl, and/or from aryls, and in particular phenyl, methyl being more particularly preferred, the R radicals being identical or different when $a=2$,
*Y is a linear or branched alkoxy radical chosen from $C_1$–$C_{15}$ alkoxys, and in particular $C_1$–$C_6$ alkoxys, methoxy, ethoxy and (iso)propoxy being more particularly used,
-β- and, on the other hand, at least one functional siloxy unit of formula:

$(R)_b \, W \, Si(O)_{3-\frac{b}{2}}$ (II)

in which
*$b=0$, 1 or 2,
*R corresponds to the same definition as that given above for the R substituent of the unit (I) and can be identical to or different from the latter,
*W is a monovalent hydrocarbon radical having from 2 to 30 carbon atoms and optionally S and/or O atoms and constituting a functional residue connected to the silicon via an Si-C bond,
this residue being chosen from the following groups:
(i) a linear or branched alkyl group comprising at least 7 carbon atoms, (2i) a linear or branched $C_2$–$C_{20}$ alkenyl group containing one or a number of double bonds in the chain(s) and/or at the end(s) of chain(s), the said double bonds preferably being conjugated and/or combined with at least one activating group situated in the α-position,
(3i) an unsaturated mono- or bicyclic aliphatic group containing 5 to 20 cyclic carbon atoms and one or two ethylenic double bond(s) in the ring, which double bond(s) is/are optionally substituted by one or two linear or branched $C_1$–$C_3$ alkyl group(s), optionally connected to the silicon via a linear or branched $C_2$–$C_{10}$ alkylene radical,
-γ- and, optionally, at least one siloxy unit (III) of formula:

$(R)_c \, (H)_d \, Si(O)_{4-(c+d)_2}$ (III)

in which:
*$c=0$, 1, or 2, $d=1$ and $c+d \leq 3$,
*the R substituents being as defined above in the units (I) and (II);
♦ (B) are compounds of formula (IV):

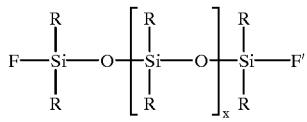

(IV)

in which
*the R symbol corresponds to the same definition as that of R given above in the key of the formula (I), it being possible for the various R radicals to be identical to or different from one another,
*$x=0$ to 1,000, preferably $x=0$ to 100,
*F and F' are monovalent radicals chosen from: hydrogen, halogens (and preferentially chlorine), those corresponding to the definition of R, and/or hydroxyl, alkoxy, enoxy, acyloxy (in particular acetoxy), oxime and amine functional groups, the hydroxyl, methoxy and ethoxy functional groups being more particularly preferred, it being possible for F and F' to be different or identical but, in the case where F is identical to F', it cannot then be the R radical;
♦(C) are hydroxylated or alkoxylated silicone resins exhibiting, per molecule, at least 2 different units chosen from those of formula: $R'_3SiO_{0.5}$ (M), $R'_2SiO$ (D), $R'SiO_{1.5}$ (T) and $SiO_2$ (Q), at least one of these units being a T or Q unit, the R' radicals, which are identical or different, being mainly chosen from linear or branched $C_1$–$C_6$ alkyl radicals, the vinyl radical, the phenyl radical and the 3,3,3-trifluoropropyl radical and having a content by weight of hydroxyl or alkoxy groups (in particular methoxy and ethoxy groups) of between 0.1 and 10%.

The polyorganosiloxanes (A) are remarkable in that the Y functional substituent is hydrolysable and makes possible grafting to the silica, whereas the W functional substituent is more difficult to hydrolyse than the Y functional substituent and is capable of expressing various properties, depending on its chemical nature.

The W substituent of the unit of formula II is preferentially chosen from the following radicals:
an alkyl radical (i) comprising from 8 to 30 carbon atoms and preferably chosen from the following alkyl radicals: octyl, dodecyl, undecyl or tridecyl;

a $C_6$–$C_{10}$ radical (2i) containing a double bond and optionally another conjugated to the first, the said radical advantageously being hexenyl or dodecenyl;

a monocyclic $C_5$–$C_6$ radical (3i), preferably cyclohexenyl or 1-methylcyclohex-1-enyl, optionally connected to the silicon via a linear or branched $C_2$–$C_6$ alkylene radical, preferably —$CH_2$—$CH_2$—, —$CH_2$—$CH(CH_3)$— or —$(CH_2)_3$—.

It is to be emphasized that, whenever more than one example of a unit of a given type (I, II or III) is present in the polyorganosiloxane (A), the various examples can be identical to or different from one another. Advantageously, it is even possible to benefit from this plurality. For example, functionalized polyorganosiloxanes carrying both ethoxy and methoxy functional groups as Y functional groups will make it possible for the person skilled in the art to modulate the rate of reaction with the silica according to the respective percentages of the two functional groups.

It should be understood, taking account of the values which the indices a to d attributed to the substituents in the units (I), (II) and (III) can take, that the polyorganosiloxanes (A) can exhibit a linear and/or branched and/or cyclic structure.

The preferred R radicals are: methyl, ethyl, n-propyl, isopropyl or n-butyl, preferably methyl. More preferentially still, at least 80% by number of the R radicals are methyls.

The preferred Y alkoxy radicals are ethoxys.

To be more specific still with respect to the polyorganosiloxanes (A) concerned, mention may first of all be made of those formed by statistical, sequential or block linear copolymers of following average formula

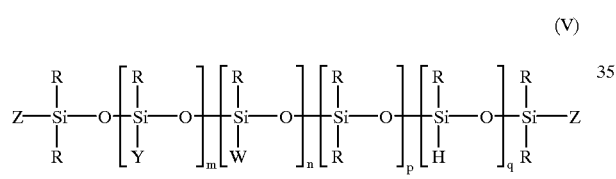

(V)

in which:
the Y, W and R symbols are as defined above,
the Z symbol is a monovalent radical chosen from the radicals formed by hydrogen and from those corresponding to the definitions of R, Y and W,
the sum $m+n+p+q \geq 3$, preferably of between 3 and 100, the case in which $p=q=0$, $m \geq 1$ and $n \leq 50$ being more particularly preferred,
$0 \leq m \leq 100$, preferably $1 \leq m \leq 50$
$0 \leq n \leq 100$, preferably $1 \leq n \leq 50$
$0 \leq p \leq 20$, preferably $0 \leq p \leq 10$
$0 \leq q \leq 40$, preferably $0 \leq q \leq 20$
with the conditions according to which:
♦ if m=0, at least one of the Z substituents corresponds to a radical corresponding to the definition characterizing Y,
♦ if n=0, at least one of the Z substituents corresponds to a radical corresponding to the definition characterizing W,
♦ and, if m=n=0 and $p+q \geq 1$, then one of the Z substituents corresponds to a radical corresponding to the definition characterizing Y and the other of the Z substituents corresponds to the definition characterizing W.

Mention may-be made, among the more particularly preferred polyorganosiloxanes of formula (V), of those for which $p=q=0$ and $0.1 \leq m/n \leq 5$, preferably $1 \leq m/n \leq 5$ and more preferentially $1.5 \leq m/n \leq 3$.

Mention may be made, as examples of functionalized linear polyorganosiloxanes (A), of the compounds corresponding to the following formulae:

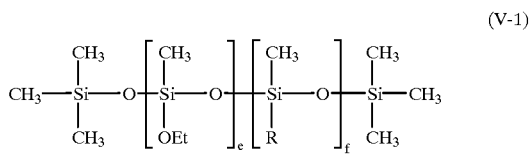

(V-1)

with, on average: e=35, f=15 and R corresponding to (V-2)

—$(CH_2)_2$—⬡

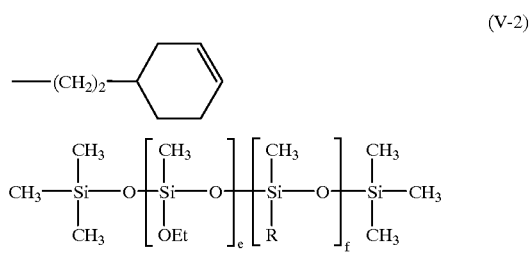

with, on average, e=28, f=14 and R corresponding to —$(C_2)_7$—$CH_3$

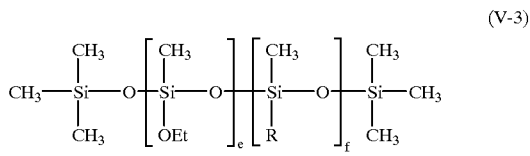

(V-3)

with, on average, e=23, f=8.5 and R corresponding to —$(CH_2)_4$—CH=$CH_2$.

An alternative to the linear structure of the polymers of formula (V) defined above relates to the polyorganosiloxanes (A) composed of cyclic copolymers of following average formula:

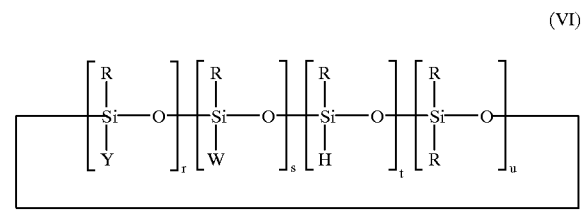

(VI)

in which Y, W and R are as defined above and with r, s, t and u representing integers or positive decimals:
♦ the sum $r+s+t+u \geq 3$, preferably of between 3 and 8, the case in which t=u=0 being more particularly preferred,
♦ $1 \leq r \leq 8$, preferably $1 \leq r \leq 4$
♦ $1 \leq s \leq 8$, preferably $1 \leq s \leq 4$
♦ $0 \leq t \leq 8$, preferably $0 \leq t \leq 4$
♦ $0 \leq u \leq 8$, preferably $0 \leq u \leq 4$.

The polyorganosiloxanes according to the invention are preferably composed of products corresponding to those for which R=$CH_3$ and p=u=0 in the formulae (V) and (VI) defined above.

It is obvious that, in these formulae (V) and (VI), as already indicated above, the W radicals can be identical or different in nature when n>1 and s>1.

The mixtures of polyorganosiloxanes of the type of those defined above come within the scope of the present invention.

These polyorganosiloxanes are obtained according to a process composed of:
- on the one hand, reacting a starting polyorganosiloxane comprising units of formula (II) as defined above, in which W represents hydrogen, with at least one alcohol from which the Y functionality of the unit (I) derives and which is useful both as reactant and as reaction solvent, in the presence of a catalyst, at least one of the active elements of which is chosen from transition metals, according to a dehydrocondensation mechanism (1st phase),
- and, on the other hand, using the addition of the polyorganosiloxane converted by dehydrocondensation to at least one olefin compound from which the W functionality of the unit (II) derives, according to a hydrosilylation mechanism (2nd phase), in the presence of a catalyst and preferably at a temperature of between 5 and 100° C. and more preferentially still between 20 and 90° C.

The alcohols used are preferably linear or branched monohydroxylated alkanols (primary, secondary or tertiary, preferably primary) preferably chosen from the following list: methanol, ethanol, (iso)propanol or (n) butanol, ethanol being preferred.

As regards the catalyst, it is advantageously chosen from those containing at least one of the following elements: Pt, Rh, Ru, Pd, Ni and their combinations, this catalyst optionally being coupled to an inert or active support.

According to a preferred arrangement, the catalyst is taken from the family of platinum catalysts conventionally used for carrying out hydrosilylation reactions. These platinum catalysts are fully described in the literature. Mention may in particular be made of the complexes of platinum and of an organic product described in United States Patents U.S. Pat. No. 3,159,601, U.S. Pat. No. 3,159,602 and U.S. Pat. No. 3,220,972 and European Patents EP-A-057,459, EP-188,978 and EP-A-190,530 and the complexes of platinum and of vinylated organopolysiloxane described in United States Patents U.S. Pat. No. 3,419,593, U.S. Pat. No. 3,715,334, U.S. Pat. No. 3,377,432 and U.S. Pat. No. 3,814,730. The Karstedt catalyst is an example of a platinum catalyst which is suitable for the process used here (Patent U.S. Pat. No. 3,775,452, Karstedt).

Nickel-based catalysts, such as, for example, Raney nickel, are a possible alternative to platinum catalysts.

As regards the reaction conditions, the dehydrocondensation can be carried out over a wide temperature range extending, for example, from 0 to 200° C. but it is clear that it is preferable for it to be carried out at a temperature of between 20 and 80° C., preferably between 40 and 70° C.

The second phase of the process comprises an addition reaction of the intermediate hydrogen-containing polyorganosiloxane produced by dehydrocondensation to at least one olefin compound carrying at least one π-bond.

It involves a hydrosilylation mechanism, in the presence of a catalyst and, preferably, at a temperature of between 5 and 100° C. and more preferentially still between 20 and 90° C.

According to a preferred methodology, the hydrosilylation is initiated by adding the olefin compound, from which the W radical as defined above derives, to the intermediate alkoxylated polyorganosiloxane, once the dehydrocondensation is complete. In practice, this addition can be carried out when hydrogen evolution has ceased.

The reactive alkene can be formed by a mixture of products containing a single or a number of precursor species of W radicals which determine the multifunctionality of the final polyorganosiloxane. In the case where a number of W species are provided, the alkene corresponding to the second functionality is preferably first allowed to react, then, once this alkene has completely reacted, the alkene corresponding to the third functionality is incorporated, and so on.

Instead of being incorporated in the reaction mixture after the dehydrocondensation, the olefin compound which is the precursor of W can be employed before beginning this first phase of the process or alternatively during the latter.

The olefin compounds employed can easily be deduced from the definition of W given above. The choice with respect to this radical is determined by the targeted applications (one or a number of different functionalities).

The hydrosilylation phase can advantageously take place at ambient temperature and in bulk or in solution, for example in the alcohol which has been used as solvent and as reactant in the dehydrocondensation reaction.

At the end of the reactions, the crude polyorganosiloxanes which are obtained can be purified, in particular by passing through a column filled with an ion-exchange resin and/or by simple evaporation, of the reactants introduced in excess and optionally of the solvent used, by heating carried out between 100 and 180° C. under reduced pressure.

The starting polyorganosiloxane is advantageously selected from those corresponding to the following formula:

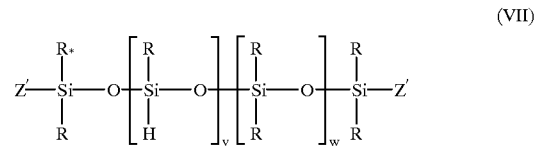

(VII)

in which:
* the R symbols are identical or different and are as defined above in the key to the formula of the units (I) and (II),
* the Z' symbols are identical or different and correspond to R or to hydrogen,
* v is an integer or a decimal $\geq 0$ definable as follows: v=n+m+q; n, m and q corresponding to the definitions given above in the key of the formula (V) with the condition according to which, if v=0, then w$\geq$1 and the two Z' radicals correspond to hydrogen,
* w corresponds to the same definition as that of p given above in the key of the formula (V).

The starting polyorganosiloxanes which are used, for example, in the preparation of the functionalized cyclic products are those selected from those corresponding to the following average formula:

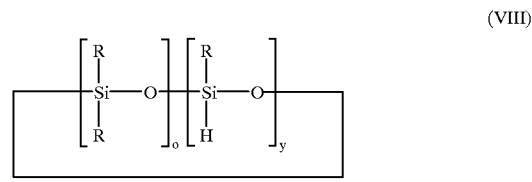

(VIII)

in which:
* the R symbols are identical or different and are as defined above in the key to the formula of the units (I) and (II),

*o corresponds to the same definition as that of u given above in the key of the formula (VI),

*y is an integer or a decimal $\geq 0$ definable as follows: y=r+s+t and y+u$\geq$3, r, s, t and u corresponding to the definitions given above in the key of the formula (VI).

The following are preferentially suitable as examples of compounds (B) of formula (IV):

polydimethylsiloxanes terminated by silanols, such as the following commercial products manufactured by Hüls America Inc., which appear in the 1994 catalogue of the company ABCR—Roth-Sochiel SARL under the references:

POS 340:

$$HO-\underset{\underset{CH_3}{|}}{\overset{\overset{CH_3}{|}}{Si}}-O-\left[\underset{\underset{CH_3}{|}}{\overset{\overset{CH_3}{|}}{Si}}-O\right]_a-\underset{\underset{CH_3}{|}}{\overset{\overset{CH_3}{|}}{Si}}-OH$$

with a representing a positive integer, to give a weight-average mass of between 400 and 700,

POS 341:

$$HO-\underset{\underset{CH_3}{|}}{\overset{\overset{CH_3}{|}}{Si}}-O-\left[\underset{\underset{CH_3}{|}}{\overset{\overset{CH_3}{|}}{Si}}-O\right]_a-\underset{\underset{CH_3}{|}}{\overset{\overset{CH_3}{|}}{Si}}-OH$$

with a representing a positive integer, to give a weight-average mass of 4,200, polydimethylsiloxanes terminated by ethoxy groups, such as the following commercial products manufactured by Hüls America Inc. and which appear in the 1994 catalogue of ABCR—Roth-Sochiel SARL under the reference POS 395 (products manufactured by Hüls):

POS 395:

$$EtO-\underset{\underset{CH_3}{|}}{\overset{\overset{CH_3}{|}}{Si}}-O-\left[\underset{\underset{CH_3}{|}}{\overset{\overset{CH_3}{|}}{Si}}-O\right]_a-\underset{\underset{CH_3}{|}}{\overset{\overset{CH_3}{|}}{Si}}-OEt$$

with a representing a positive integer, to give a weight-average mass of between 700 and 1200.

The compounds (C) are silicone resins composed of small macromolecular networks of one or a number of ring(s) as the result of their presence in the molecule of at least 2 different units chosen from the M, D, T and Q units, at least one of these units being a T or Q unit, and containing reactive functional groups.

Resins are preferentially chosen which have a structure in which the R' radicals of the M, D, T and Q units are methyl, ethyl, isopropyl, tert-butyl and n-hexyl radicals.

Mention may be made, as examples of such resins, of MQ resins, MDQ resins, DT resins and MDT resins containing the R' radicals mentioned in the preceding paragraph and having a content by weight of hydroxyl or alkoxy groups of between 1 and 6%.

Use may more particularly be made of resins exhibiting a molecular mass of less than 25,000.

First subject of the invention:
ORGANOSILANES (OS):

One or a number of compounds corresponding to at least one of the four following general formulae (IX) to (XII) are suitable as organosilane compounds which can be used in the context of the invention:

OS of formula (IX)

$$\left[\begin{array}{c}(R^1)_{n'}\\ \diagdown\\ (K)_{3-n'}\diagup\end{array}Si-(Alk)_{m'}-(Ar)_{p'}\right]_{q'}-D$$

in which:

→ $R^1$ represents an alkyl group containing 1 to 10 carbon atom(s) or alternatively the phenyl radical, → K represents a hydrolysable group chosen from:
halogens, preferably chlorine,
alkoxy or cycloalkoxy radicals, themselves optionally substituted by alkoxy radicals,
acyloxy radicals,
after hydrolysis, K can optionally represent a hydroxyl group (OH), → $0 \leq n' \leq 2$ → (Alk) represents a divalent hydrocarbon group chosen from linear or branched alkylenes having from 1 to 10, and advantageously from 1 to 6, atom(s) and optionally substituted by a $C_6$–$C_{12}$ aryl radical, → m' represents 0 or 1, → (Ar) represents a hydrocarbon group chosen from aryls having from 6 to 12 atoms and preferably 6 to 8, → p' represents 0 or 1, with the condition that p' and m' are not simultaneously equal to 0, → q'=1 or 2, → D represents a group capable of forming a bond with at least one of the elastomers of the composition.

The preferred D groups are mercapto (SH) groups for q'=1 and polysulphide ($S_x$) and disulphide ($S_2$) groups for q'=2.

However, the D group can also include other groups capable of reacting with the elastomers of the composition, for example:

D represents:

*if q'=2, a polysulphide functional group chosen from the following groups:
-Sx-
with $1 \leq x \leq 8$ $$\underset{\|}{\overset{\overset{O}{\|}}{C}}-S-S-\underset{\|}{\overset{\overset{O}{\|}}{C}}$$

$$\underset{\|}{\overset{\overset{S}{\|}}{C}}-S-S-\underset{\|}{\overset{\overset{S}{\|}}{C}}$$

$$-CH-CH-$$
$$\diagdown\diagup$$
$$S$$

*if q'=1, a functional group chosen from the following groups:

—SH $$-CH-CH_2$$
$$\diagdown\diagup$$
$$S$$

-continued

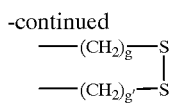

with $1 \leq g, g' \leq 6$ and it being possible for g to be the same as g'

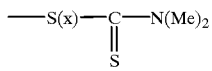

with $1 \leq x \leq 8$

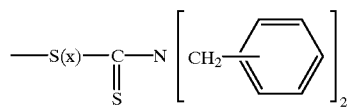

with $1 \leq x \leq 8$.

The mixed dibenzylaminothiocarbonyl γ-trimethoxysilylpropyl disulphide and the mixed dibenzylaminothiocarbonyl γ-triethoxysilylpropyl disulphide are suitable as preferential compounds corresponding to this definition.

[These compounds are obtained by reaction of a metal salt dithiocarbamate, preferentially sodium and potassium dithiocarbamate, with a sulphenyl chloride, prepared beforehand from the corresponding thiol, according to a process which takes place in three stages, as described below, by way of example, for the mixed dibenzylaminothiocarbonyl γ-triethoxysilylpropyl disulphide:

1) Synthesis of sodium dibenzyldithio-carbamate 59.20 g (0.3 mol) of dibenzylamine, diluted in 200 ml of ethanol, are placed in a 1-liter three-necked flask subjected to magnetic stirring and surmounted by a bulb condenser.

Moreover, 12 g (0.3 mol) of sodium hydroxide pellets are dissolved in 300 ml of ethanol. This solution is placed in a dropping funnel which is then positioned on the three-necked flask containing the ethanolic dibenzylamine solution. It is then added slowly (dropwise) at room temperature. The mixture thus formed is then brought to reflux for 2 hours.

It is then cooled to a temperature of less than 4° C. 22.85 g (0.3 mol) of carbon disulphide are then added slowly (dropwise) via a dropping funnel. Once addition is complete, the temperature of the solution is allowed to return to room temperature and the reaction is continued for 15 hours.

The solution is then concentrated: the residue is taken up in 150 ml of toluene. A white precipitate forms. It is recovered by filtration under vacuum and washed a number of times with toluene. After drying under vacuum for 24 hours at 40° C., 67.5 g of sodium dibenzyldithiocarbamate are recovered.

2) Preparation of a toluene solution of γ-triethoxysilylpropanesulphenyl chloride 40.01 g (0.3 mol) of N-chlorosuccinimide and 150 ml of toluene are placed in a 1-liter three-necked flask, placed under an inert atmosphere, equipped with a bulb condenser and a dropping funnel and subjected to magnetic stirring.

71.45 g (0.3 mol) of 3-mercaptopropyltriethoxysilane are added slowly to this stirred suspension at a temperature of less than 4° C. The mixture then immediately takes on an orange-yellow colour.

Once addition is complete, the temperature of the mixture is allowed to return to room temperature and stirring is continued for 2 hours. The recovered solution is then filtered; the succinimide is thus removed. The filtrate (toluene solution of γ-triethoxysilylpropanesulphenyl chloride) is recovered and quickly used.

3) Preparation of the mixed disulphide 88.63 g (0.3 mol) of sodium dibenzyldithiocarbamate obtained on conclusion of the first stage, dissolved in an ethanol/toluene (500 ml/150 ml) mixture, are placed in a 2-liter three-necked flask, placed under an inert atmosphere, subjected to magnetic stirring and equipped with a bulb condenser and a dropping funnel.

The solution prepared during the second stage is slowly added at a temperature of less than 4° C. Once addition is complete, reaction is allowed to take place for 24 hours at room temperature.

The solution recovered is then filtered to remove the sodium chloride formed. The solvents are evaporated.

A viscous yellow liquid is recovered; it is purified by successive solubilizations in toluene. 74 g of mixed disulphide are finally recovered]

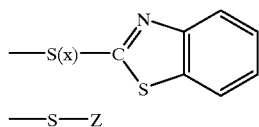

with $1 \leq x \leq 8$ and Z being a halogen and preferably a chloride or bromide, or a nitrogenous function, preferably an amine or an amide,

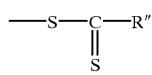

where R″ is a linear or branched $C_1$–$C_{30}$ alkenyl or alkyl group, a $C_3$–$C_{30}$ cycloalkyl or cycloalkenyl group or a $C_6$–$C_{20}$ heterocyclic or carbocyclic aryl group,

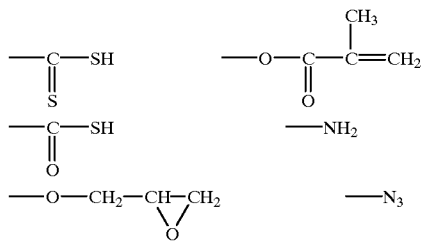

OS of formula (X)

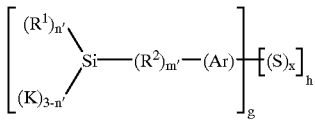

in which:
→ $R^1$ and K correspond to the same definition as that given above in the key of the formula (IX),
→ $0 \leq n' \leq 2$
→ ($R^2$) represents a divalent hydrocarbon group chosen from linear or branched alkylenes and alkylenoxys having from 1 to 10 carbon atom(s) and advantageously from 1 to 6, → m' represents 0 or 1,
→ (Ar) represents a hydrocarbon group chosen from aryls having from 6 to 12 carbon atoms,
→ $(S)_x$ is a divalent polysulphide radical, each free valency being directly bonded to a carbon atom of an aromatic ring, it being possible for a number of aromatic rings to be connected to one another via the $(S)_x$ radical,
→ $2 \leq x \leq 6$
→ $g \geq 2$ and $h \geq 1$ with $0.4 \leq g/h \leq 2$;

OS of formula (XI):

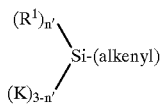

in which:
→ $R^1$ and K correspond to the same definition as that given above in the key of the formula (IX),
→ $0 \leq n' \leq 2$,
→ alkenyl represents a cyclic or non-cyclic, linear or branched hydrocarbon group, containing one or a number of double bonds, having from 2 to 20 carbon atoms and preferably from 2 to 6. The double bonds are preferably conjugated and/or combined with at least one activating group situated in the α-position.

This binding agent family corresponding to the formula (XI) is preferably used, in rubber-manufacturing compositions, with at least one radical initiator, preferably comprising at least one peroxide.

OS of formula (XII):

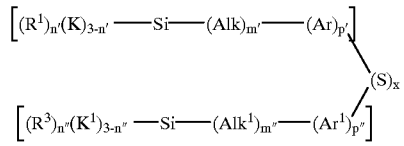

in which:
→ the $R^1$ and $R^3$ symbols are identical or different and correspond to the same definition as that of $R^1$ above given in the key of the formula (IX),
→ K and $K^1$ are identical or different and correspond to the same definition as that of K above given in the key of the formula (IX),
→ the x symbol is a positive integer between 1 and 8, $(S)_x$ thus representing a polysulphide radical,
→ Alk and $Alk^1$ symbols are identical or different and correspond to the same definition as that of Alk above given in the key of the formula (IX),
→ the n' and n" symbols are identical or different and correspond to the same definition as that of n' above given in the key of the formula (IX),
→ the m' and m" symbols are identical or different and correspond to the same definition as that of m' above given in the key of the formula (IX),
→ the Ar and $Ar^1$ symbols are identical or different and correspond to the same definition as that of Ar above given in the key of the formula (IX),
→ the p' and p" symbols are identical or different and correspond to the same definition as that of p' above given in the key of the formula (IX), with the condition of not simultaneously having n'=n", m'=m", p'=p", $K=K^1$, $R^1=R^3$, $Alk=Alk^1$ and $Ar=Ar^1$.

Mercaptosilanes of formula (IX) are highly suitable OS compounds; use is preferentially made of a 3-mercaptopropyltri($C_1$–$C_6$ alkoxy)silane and more preferentially of 3-mercaptopropyltrimethoxy(or triethoxy)silane.

Other compounds of this type which are highly suitable are bis[tri($C_1$–$C_4$ alkoxy)silylpropyl] tetrasulphides of formula (IX); use is preferentially made of bis (triethoxysilylpropyl) tetrasulphide.

Other OS compounds which are suitable are tri($C_1$–$C_6$ alkoxy)alkenylsilanes of formula (XI), it being possible for each alkoxy radical optionally to be itself substituted by a $C_1$–$C_3$ alkoxy radical, and more preferentially vinyltri(2-methoxyethoxy)silane.

Examples of commercial organosilane compounds are given in the table below. Of course, the invention is not limited to these compounds.

| Chemical Name | Formula | Trade name/ supplier |
|---|---|---|
| 3-Mercaptopropyltrimethoxy-silane | $HS(CH_2)_3Si(OCH_3)_3$ | A - 189/OSI |
| 3-Mercaptopropyltriethoxy-silane | $HS(CH_2)_3Si(OC_2H_5)_3$ | Dynasylan 3201/Hüls |
| Vinyltriethoxysilane | $C_2H_3Si(OC_2H_5)_3$ | Dynasylan VTEO/Hüls |
| 3-Aminopropyltrimethoxy-silane | $NH_2(CH_2)_3Si(OC_2H_5)_3$ | A - 1100/OSI |
| 3-Methacryloyloxypropyltri-methoxysilane | $CH_2CCH_3COO(CH_2)_3Si-(OCH_3)_3$ | A - 174/OSI |
| Mercaptomethyldimethyl-ethoxysilane | $HSCH_2Si(CH_3)_2(OC_2H_5)$ | M8200/ABCR |
| Bis(triethoxysilyl-propyl) tetrasulphide | $[(C_2H_5O)_3Si(CH_2)_3S_2]_2$ | Si 69/Degussa |
| Bis(trimethoxysilyl-propyl) tetrasulphide | $[(CH_3O)_3Si(CH_2)_3S_2]_2$ | Si 167/Degussa |
| 3-Chloropropyltrimethoxy-silane | $(CH_3O)_3Si(CH_2)_3Cl$ | Si 130/Degussa |
| 3-Thiocyanatopropyl tri-ethoxysilane | $(C_2H_5O)_3Si(CH_2)_3SCN$ | Si 264/Degussa |
| Bis(triethoxysilylethyl tolyl)trisulphide | $[C_2H_5O)_3Si(CH_2)_2\text{-}C_6H_5(CH_3)]_2[(S)_3]$ | URC2/OSI |

II—A second subject of the present invention is the elastomer compositions comprising a siliceous filler which are obtained by virtue of the employment of an effective amount of the specific combination of silicone compounds spoken of above comprising the combination of at least one POS compound with at least one OS compound.

More specifically, these compositions comprise (the parts are given by weight):
per 100 parts of elastomer(s),
10 to 100 parts of siliceous filler, and preferably 20 to 80,
an amount of POS+OS combinations which results, in each composition, in:
*0.5 to 15 parts, and preferably 2 to 10 parts, of POS per 100 parts of siliceous filler, and
*0.2 to 8 parts, and preferably 0.5 to 5 parts, of OS per 100 parts of siliceous filler.
→ Second subject of the invention:
SILICEOUS FILLER:

All precipitated silicas known to the person skilled in the art exhibiting a BET specific surface $\leq 450$ m$^2$/g are suitable as silica capable of being used in the invention, even if highly dispersible precipitated silicas are preferred.

Highly dispersible silica is understood to mean any silica having a very high ability to deagglomerate and to disperse in a polymer matrix observable by electron or optical microscopy on thin sections. The dispersibility of the silica is also assessed by means of a test of ability to deagglomerate with ultrasound, followed by a measurement, by scattering using a particle sizer, of the size of the silica particles, in order to determine the median diameter (D50) of the particles and the deagglomeration factor (Df) after deagglomeration, as described in Patent U.S. Pat. No. 5,403,570, the contents of which are incorporated here.

Mention may be made, as non-limiting examples of such preferential highly dispersible silicas, of those having a CTAB specific surface equal to or less than 450 m$^2$/g and particularly of those described in Patent U.S. Pat. No. 5,403,570 and Patent Applications WO-A-95/09127 and WO-A-95/09128, the contents of which are incorporated here, or of the silica Zeosil 1165 MP from the company Rhône-Poulenc.

However, silicas having:
- a CTAB specific surface of between 100 and 240 m$^2$/g, preferably between 145 and 180 m$^2$/g,
- a BET specific surface of between 100 and 250 m$^2$/g, preferably between 150 and 190 m$^2$/g,
- a DOP oil uptake of less than 300 ml/100 g, preferably of between 200 and 295 ml/100 g,
- a median diameter ($\varnothing_{50}$), after deagglomeration with ultrasound, equal to or less than 8 μm, preferably less than 5 μm, for example less than 2.5 μm,
- a deagglomeration factor with ultrasound (Df) greater than 3 ml, preferably greater than 5.5 ml and more preferentially $\geq$ 11 ml,
- a BET specific surface/CTAB specific surface ratio $\geq$ 1.0 and $\leq$ 1.2 are more preferentially suitable.

The physical state under which the silica is provided, that is to say whether it is provided in the powder, microbead, granule or ball form, is unimportant, as is the specific surface of the silica.

Of course, silica is also understood to mean blends of different silicas. The silica can be used alone or in the presence of other white fillers. The CTAB specific surface is determined according to NFT method 45007 of November 1987. The BET specific surface is determined according to the method of Brunauer, Emmet and Teller described in "The Journal of the American Chemical Society, vol. 80, page 309 (1938)", corresponding to NFT standard 45007 of November 1987. The DOP oil uptake is determined according to NFT standard 30-022 (March 1953), dioctyl phthalate being used.

→ Second subject of the invention:

ELASTOMERS:

Elastomers capable of being used for the compositions in accordance with the second subject of the invention is understood to mean:

(1) the homopolymers obtained by polymerization of a conjugated diene monomer having from 4 to 22 carbon atoms, such as, for example: 1,3-butadiene, 2-methyl-1,3-butadiene, 2,3-dimethyl-1,3-butadiene, 2,3-diethyl-1,3-butadiene, 2-methyl-3-ethyl-1,3-butadiene, 2-chloro-1,3-butadiene, 2-methyl-3-isopropyl-1,3-butadiene, 1-phenyl-1,3-butadiene, 1,3-pentadiene or 2,4-hexadiene;

(2) the copolymers obtained by copolymerization of one or a number of the abovementioned conjugated dienes with one another or with one or a number of ethylenically unsaturated monomers chosen from:
vinylaromatic monomers having from 8 to 20 carbon atoms, such as, for example: styrene, ortho-, meta- or para-methylstyrene, chlorostyrenes, vinylmesitylene, divinylbenzene or vinylnaphthalene;

vinyl nitrile monomers having from 3 to 12 carbon atoms, such as, for example acrylonitrile or methacrylonitrile;

acrylic ester monomers derived from acrylic acid or from methacrylic acid with alkanols having from 1 to 12 carbon atoms, such as, for example, methyl acrylate, ethyl acrylate, propyl acrylate, n-butyl acrylate, isobutyl acrylate, 2-ethylhexyl acrylate, methyl methacrylate, ethyl methacrylate, n-butyl methacrylate or isobutyl methacrylate;

(3) the copolymers obtained by copolymerization of ethylene with an a-olefin having from 3 to 6 carbon atoms, such as, for example, the elastomers obtained from ethylene and propylene (EPR elastomers);

(4) the ternary copolymers obtained by copolymerization of ethylene and an α-olefin having 3 to 6 carbon atoms with a non-conjugated diene monomer having from 6 to 12 carbon atoms, such as, for example, the elastomers obtained from ethylene and propylene with a non-conjugated diene monomer of the abovementioned type, such as, in particular, 1,4-hexadiene, ethylidenenorbornene or dicyclopentadiene (EPDM elastomer);

(5) natural rubber;

(6) the copolymers obtained by copolymerization of isobutene and isoprene (butyl rubber) and the halogenated versions, in particular chlorinated or brominated, of these copolymers;

(7) a mixture of a number of the abovementioned elastomers (1) to (6) with one another;

(8) chlorosulphonated polyethylenes;

(9) fluorinated hydrocarbons;

(10) elastomers of the epichlorohydrin-ethylene oxide or polyepichlorohydrin type.

Recourse is preferentially had to one or a number of elastomer(s) chosen from: polybutadiene, polychloroprene, polyisoprene, poly(styrene-butadiene), poly(acrylonitrile-butadiene), in the hydrogenated or non-hydrogenated form, poly(styrene-butadiene-isoprene), an ethylene/propylene/non-conjugated diene monomer terpolymer or butyl rubber.

→ Second subject of the invention:

OTHER CONSTITUENTS:

The compositions in accordance with the invention additionally contain all or a portion of the other auxiliary additives and constituents commonly used in the area of elastomer and rubber compositions.

Thus, use may be made of all or a portion of the following other constituents and additives:

∝ as regards the vulcanization system, mention will be made, for example, of:
vulcanizing agents, such as, for example, organic peroxides, and/or curing agents chosen from sulphur or sulphur-donating compounds, such as, for example, thiuram derivatives, and other compound (s) used in this context, such as, for example, zinc oxide, stearic acid and zinc stearate;
sulphur curing accelerators, such as, for example, guanidine derivatives, thiazole derivatives or sulphenamide derivatives;

∝ as regards other additive(s), mention will be made, for example, of:
fillers, such as, for example, carbon black, titanium dioxide and/or kaolin;

antioxidants;

antiozonants, such as, for example, N-phenyl-N'-(1,3-dimethylbutyl)-p-phenylenediamine;

plasticizing agents or oils.

In a way unforeseeable to the person skilled in the art, it has been discovered that the elastomer compositions in accordance with the invention and comprising a coupling agent composed of at least one POS polyorganosiloxane and at least one OS organosilane compound exerting a silica/elastomer bond make it possible:

*to use high levels of OS organosilane agents belonging to the mercaptosilane family, without suffering any disadvantage in terms of "scorch safety" and without disturbing the use of the elastomer compositions,

*to substantially increase the effectiveness of the OS organosilane agents and particularly those of the mercaptosilane type,

*to prepare vulcanisates containing silica as filler which exhibit an improved hysteresis, these compositions being particularly useful for the manufacture of semi-finished products, in particular conveyor belts, power transmission belts, flexible pipes, expansion joints, seals for domestic electrical appliances, supports which act to remove engine vibrations, either with metal frameworks or with a hydraulic fluid within the elastomer, spring components situated between the rigid articulated metal components of the caterpillar track of a vehicle in contact with the ground, cables, cable sheathings, shoe soles and rollers for cableways,

*to obtain green use properties by reducing the viscosity,

*to facilitate adjustment of the level of silica/elastomer coupling agent (in particular for low levels) by the use of two products instead of one, without necessarily being disadvantaged in terms of use and scorch safety,

*generally, to prepare vulcanisates containing silica as filler which exhibit an advantageous compromise in properties in comparison with the solutions already known in the art.

III—A third subject of the present invention relates to the processes for the preparation of the elastomer compositions comprising a siliceous filler which are described above in Part II of this statement.

The combination of at least one POS compound with at least one OS compound, acting as silica/elastomer coupling agent, can be prepared beforehand and can be added in the state in which it is found after its preparation, immediately or at another time, to the mixture of elastomer(s) comprising the siliceous filler (so-called one-step process), the preparation being carried out in a conventional internal mixer device. An alternative form of the said one-step process comprises the direct addition at the time of use, simultaneously or one after the other, of at least one POS silicone compound and at least one OS silicone compound to the mixture of elastomer(s) comprising the siliceous filler, at any point in the preparation of this mixture.

Advantages have been found in a procedure which comprises 2 steps (so-called two-step process) and is composed, the preparation being carried out in a conventional internal mixer device, of:

Step 1: the preparation, first, of a first mixture comprising the elastomer or elastomers, a siliceous filler and at least one POS silicone compound and optionally a portion of the usual auxiliary constituent or constituents, Step 2: then, immediately or at another time, the subsequent preparation of a second mixture comprising the first mixture, at least one OS silicone compound and all or a portion of the usual auxiliary constituent or constituents.

It may be advantageous to introduce the vulcanizing/curing agent or agents and all or a portion of the accelerator or accelerators after the preparation of the second mixture, the preparation being carried out in a conventional external mixer, such as, for example, a roll mill.

In the context of carrying out the so-called one-step or two-step process, it is possible to obtain satisfactory elastomer compositions by reacting, before incorporating the silica in the elastomer or elastomers, at least one POS silicone compound with the siliceous filler, for example by coating the silica with the POS silicone compound or compounds.

IV—The combination resulting from combining, beforehand or at the time of use, at least one POS silicone compound with at least one OS silicone compound, used in the context of the so-called one-step process, is a product which, to the knowledge of the Applicant Company, is novel and it is hence a fourth subject of the present invention.

In the context of carrying out Step 1 of the so-called two-step process, where the POS silicone compound or compounds is/are reacted in situ with the silica in the presence of the elastomer or elastomers, the mixture obtained, known as the first mixture, which comprises the siliceous filler coated with the POS silicone compound or compounds and the elastomer or elastomers, is also, to the knowledge of the Applicant Company, a novel product and it is hence a fifth subject of the present invention.

This first mixture can be used, in the state in which it is found after its preparation, in order to add to it, immediately or at another time, at least one OS silicone compound and all or a portion of the usual auxiliary constituent or constituents, so as to prepare the second mixture spoken of above with respect to Step 2 of the so-called two-step process.

However, this first mixture can already constitute in itself, in the state in which it is found after its preparation, or in the state corresponding to the addition, if necessary, of other conventional auxiliary constituent(s), a novel elastomer composition containing a siliceous material as filler (but, this time, not containing OS silicone compound) capable of resulting in vulcanisates and articles which may already be advantageous as regards the desired improvements in respect, for example, of rheology of the compositions, of certain mechanical properties and of properties of resistance to water and to water containing washing powder. It should be noted that the employment of such a novel composition can make it possible to limit the water uptake of the silica/elastomer combination which it contains and can consequently allow the use of the composition when it has to be converted by extrusion and vulcanization, the operation being carried out continuously and without resorting to pressure, in order to prevent the formation of bubbles. Generally, the addition of at least one OS silicone compound to a composition already comprising at least one POS silicone compound will enable the desired improvement in the properties to be substantially increased.

In the context of carrying out the so-called one-step or two-step process, where use is made of a siliceous filler treated beforehand by reacting the silica with at least one POS silicone compound, a product is then formed, resulting from the covering of the silica by at least one POS silicone compound, which, to the knowledge of the Applicant Company, is also another novel product and it is hence a sixth subject of the present invention.

This covered product can be used, for example, in the state in which it is found after its preparation, in order to be incorporated, immediately or at another time, in the elastomer or elastomers, so as to prepare the first mixture spoken of above with respect to Step 1 of the so-called two-step process.

V—A seventh subject of the present invention relates to the articles made of elastomer(s) with a body comprising either the compositions described above in the context of the second subject of the invention (cf. Part II) or the compositions described above in the context of the fifth subject of the invention (cf. Part IV).

The present invention is particularly useful for preparing articles comprising engine supports, components of vehicle caterpillar tracks, shoe soles, rollers for cableways, seals for domestic electrical appliances and cable sheathings.

The following examples illustrate the present invention.

EXAMPLES 1 AND 2

These examples illustrate two identical elastomer compositions which are representative of formulations for engine supports, with the exception of the coupling agent which, in Example 1, is the POS silicone compound corresponding to the formula (V-1) and, in Example 2, is the combination of the said POS with the OS silicone compound consisting of 3-mercaptopropyl trimethoxysilane.

1) Preparation of the POS silicone compound:

300 ml of ethanol, dried beforehand over 3 angström molecular sieve, and 10 µl of Karstedt catalyst (10% in hexane) are charged, under a nitrogen atmosphere, to a 500 ml three-necked round-bottomed flask equipped with a mechanical stirrer, a thermometer and a dropping funnel. The mixture is stirred at 65° C. and the dropwise addition of the polymethylhydrosiloxane (40 g, $dp_n$=50) is begun. Significant hydrogen evolution is observed. The rate at which the Si-H fluid is run in is adjusted in order to control the hydrogen flow and the exothermicity of the reaction. When the polymethylhydrosiloxane has been run in, the mixture is left stirring for one hour.

At the end of this time, 39.16 g of 4-vinyl-1-cyclohexene and 10 µl of the initial Karstedt catalyst are run in dropwise into 100 g of polymethylhydrosiloxane containing SiOEt functionalities obtained. After addition, the reaction mixture is heated at 80–85° C. until all the SiH functional groups have been consumed. The excess alcohol is then evaporated off. 130 g of a clear oil are thus recovered, the spectral analyses of which reveal the structure corresponding to the formula (V-1)

2) Elastomer compositions

The preparation is carried out, in an internal mixer (Banbury type), of approximately 1 kg of each of the 4 mixtures for which the composition, expressed by weight, is shown in the following Table I:

TABLE I

| Compositions | | Control 1 | Ex. 1 | Ex. 2 | Control 2 |
|---|---|---|---|---|---|
| Rubber, BR 1220 | (1) | 10 | 10 | 10 | 10 |
| Rubber, NR | (2) | 90 | 90 | 90 | 90 |
| Zinc oxide | (3) | 6 | 6 | 6 | 6 |
| Stearic acid | (3) | 2.5 | 2.5 | 2.5 | 2.5 |
| Permanax 6 PPD | (4) | 2 | 2 | 2 | 2 |
| Permanax TQ | (5) | 1 | 1 | 1 | 1 |
| Silica | (6) | 30 | 30 | 30 | 30 |
| Plasticizer | (7) | 5 | 5 | 5 | 5 |
| CBS | (B) | 1.8 | 1.8 | 1.8 | 1.8 |
| TMTD | (9) | 0.2 | 0.2 | 0.2 | 0.2 |
| DPG | (10) | 0.8 | 0.8 | 0.8 | 0.8 |
| Sulphur | (11) | 0.9 | 0.9 | 0.9 | 0.9 |
| POS of formula | (V-1) | 0 | 3 | 3 | 0 |
| Mercaptopropyltrimethoxysilane | (12) | 0 | 0 | 1 | 1 |

(1) Polybutadiene with a high level of cis-1,4, sold by the Company SMPC;
(2) Natural polyisoprene-based rubber, sold by the Company Safic Alcan;
(3) Vulcanizing agent
(4) Antiozone protector based on N-phenyl-N'-(1,3-dimethylbutyl)-p-phenylenediamine, sold by the Company Akzo Chemicals;
(5) Antioxygen protector based on polymerized 2,2,4-trimethyl-1,2-dihydroquinoline, sold by the Company Akzo Chemicals;
(6) Zeosil 1165 MP silica, sold by the Company Rhône-Poulenc Chimie;
(7) Shellflex 451 FC naphthenic oil, sold by the Company Shell Chimie;
(8) Accelerator based on N-cyclohexyl-2-benzothiazolesulphenamide, sold by the Company Bayer;
(9) Accelerator based on tetramethylthiuram disulphide, sold by the Company Akzo Chemicals;
(10) Accelerator based on diphenylguanidine, sold by the Company Akzo Chemicals;
(11) Crosslinking agent;
(12) Silane A 189 organosilane, sold by the Company OSI.

Each composition is prepared in the following way:

The following Steps 1 and 2 are carried out in an internal mixer (Banbury type) rotating at 80 r/min:

| Time | Temperature | Operation |
|---|---|---|
| * Step 1: | | |
| to | 60° C. | Introduction of the elastomers. |
| to + 2 min | 90° C. | Introduction of the silica, of the stearic acid and of the POS compound of formula (V-1) |
| to + 4 min | 155° C. | Emptying of the mixer. |
| * Step 2: | | |
| to | 60° C. | Introduction of the above mixture, of the OS silicone compound (when one of them is used), of the oil, of the zinc oxide, of the protectors, of the CBS and of the DPG. |
| to + 3 min | 150° C. | Emptying of the mixer. |

The mixture obtained on conclusion of Step 2 is then introduced onto a roll mill maintained at 30° C. in order to be calendered thereon. The TMTD and the sulphur are introduced into this mill.

After homogenization and 3 finishing passes, the final mixture is calendered in the form of sheets with a thickness of 2.5 to 3 mm.

The results of the properties measured after vulcanization (mechanical properties) are presented in the following Table II; the vulcanization is carried out by bringing the compositions to 150° C. For the tear tests, the vulcanization is halted when the optimum of the vulcanization time, given by $t_c(90)$, is reached, which is determined according to the directions of ASTM standard D 2084; for the other tests, the vulcanization time is fixed at $t_c(90)+6$ min.

TABLE II

| Properties | | Control 1 | Ex. 1 | Ex. 2 | Control 2 |
|---|---|---|---|---|---|
| Shore A hardness | (1) | 47 | 50 | 55 | 50 |
| 40% Modulus of compression (MPa) | (2) | 1.65 | 1.84 | 2.41 | 2.03 |
| Tan δ, 155 Hz, at 25° C. | (3) | 0.159 | 0.134 | 0.109 | 0.114 |
| Frequency rigidification (15 to 155 Hz) | (4) | 1.03 | 1.01 | 1.00 | 1.04 |
| Tear strength, ASTM-B, notched, 1.5 mm | (5) | 46.2 | 48.7 | 67.1 | 51.6 |

(1) The measurements are carried out according to the directions of ASTM standard D 3240

(2) The measurements are carried out by application of the method defined below:
   Test specimen used: cylinder with a diameter of 19 mm and a height of 25 mm (cf. ASTM method D623-67).
   Equipment used: Instron 1342 viscoelastometer and Instron 3411 hydraulic compressor.
   Test temperature: 25° C.
   Principle: forces varying between 0 and 2.5 kN (i.e. pressures varying between 0 and 8.8 MPa) are gradually applied to the test specimen.
   The following two values are progressively and simultaneously recorded on the same test specimen: force applied (kN) and height of displacement (nm) of the hydraulic jack. The force applied is then mathematically related to a pressure. The height of displacement of the hydraulic jack is related to a percentage of deformation of the test specimen with respect to its initial height. The percentage of deformation=f (pressure applied to the test specimen) line is then plotted. This line is then used, as a chart, to obtain the pressures (MPa) to be applied to the test specimen in order to obtain, from the graph, deformations of 10, 20, 30 and 40% with respect to its initial height.

(3) The measurements are carried out by application of the method defined below:
   Test specimen used: cylinder with a diameter of 19 mm and a height of 25 mm (cf. ASTM method D623-67).
   Equipment used: Instron 1342 viscoelastometer, Instron 3411 hydraulic compressor and data acquisition and processing information system.
   Test temperature: 25° C.
   Principle: the test specimen is subjected statically to a prestress of 10% (deformation with respect to its initial height). A sinusoidal loading of:
      frequency: 155 Hz,
      DSA ("double strain amplitude") amplitude: 4% (with respect to the initial height of the test specimen),
      number of cycles: 50, with a variable computer-defined number of sequences, in order to obtain a sampling of correct statistical data, is then applied to the test specimen.
   The following are then measured:
      the modulus of elasticity (cf. NFT 46-026),
      the modulus of viscosity (cf. NFT 46-026).

The tan δ at 155 Hz is defined by the ratio: modulus of viscosity at 155 Hz/modulus of elasticity at 155 Hz.

(4) The measurements are carried out by application of the method defined below:
   Test specimen used: cylinder with a diameter of 19 mm and a height of 25 mm (cf. ASTM method D623-67).
   Equipment used: Instron 1342 viscoelastometer, Instron 3411 hydraulic compressor and data acquisition and processing information system.
   Test temperature: 25° C.
   Principle: the test specimen is subjected statically to a prestress of 10% (deformation with respect to its initial height). A sinusoidal loading of:
      frequency: 15 Hz,
      DSA ("double strain amplitude") amplitude: 4% (with respect to the initial height of the test specimen),
      number of cycles: 50, with a variable computer-defined number of sequences, in order to obtain a sampling of correct statistical data, is first of all applied to the test specimen.
   A sinusoidal loading of:
      frequency: 155 Hz,
      DSA ("double strain amplitude") amplitude: 4% (with respect to the initial height of the test specimen),
      number of cycles: 50, with a variable computer-defined number of sequences, in order to obtain a sampling of correct statistical data, is then applied to the test specimen.
   The rigidity (N/mm) is then measured for each frequency. The rigidity is defined by the ratio of the force exerted on the test specimen to the deformation which the test specimen then exhibits (mm) (with respect to its initial height).
   The 15–155 Hz frequency rigidification is then defined by the ratio: rigidity at 155 Hz/rigidity at 15 Hz.

(5) The measurements are carried out according to the directions of ASTM standard D 624 73 with test specimens of ISO R 34 type with a notch of 1.5 mm.

EXAMPLES 3–4

These examples illustrate two identical elastomer compositions which are representative of washing machine seal formulations, with the exception of the coupling agent which, in Example 3, is the POS silicone compound corresponding to the formula (V-1) and, in Example 4, is the combination of the said POS with the OS silicone compound consisting of 3-mercaptopropyltrimethoxysilane.

The preparation is carried out, in an internal mixer (Banbury type), of approximately 1 kg of each of the 4 mixtures for which the composition, expressed by weight, is shown in the following Table III:

TABLE III

| Properties | | Control 3 | Ex. 3 | Ex. 4 | Control 4 |
|---|---|---|---|---|---|
| EPDM 6505 | (1) | 100 | 100 | 100 | 100 |
| Zinc oxide | (2) | 4 | 4 | 4 | 4 |
| Stearic acid | (2) | 3.5 | 3.5 | 3.5 | 3.5 |
| Alkylbenzene plasticizer | (3) | 40 | 40 | 40 | 40 |
| PEG 4000 | (4) | 2 | 40 | 40 | 40 |
| Silica | (5) | 40 | 40 | 40 | 40 |
| Calcined kaolin, M 100 | (6) | 40 | 40 | 40 | 40 |
| MBT | (7) | 1 | 1 | 1 | 1 |
| TMTD | (8) | 1 | 1 | 1 | 1 |

TABLE III-continued

| Properties | | Control 3 | Ex. 3 | Ex. 4 | Control 4 |
|---|---|---|---|---|---|
| ZDEDC | (9) | 1 | 1 | 1 | 1 |
| Sulphur | (10) | 1.8 | 1.8 | 1.8 | 1.8 |
| POS of formula (V-1) | | 0 | 3 | 3 | 0 |
| Mercaptopropyltrimethoxysilane | (11) | 0 | 0 | 1 | 1 |

(1) Ethylene-propylene-diene monomer elastomer, sold by the Company Esso Chimie under the name Vistalon 6505;
(2) Vulcanizing agent
(3) Colourless plasticizer, sold by the Company Rhône-Poulenc Chimie under the name Progiline 151;
(4) Polyethylene glycol with a molecular weight of 4000;
(5) Zeosil 1165 MP silica, sold by the Company Rhône-Poulenc Chimie;
(6) White kaolin used as filler in the rubber industry;
(7) Ultraaccelerator based on 2-mercaptobenzothiazole;
(8) Accelerator based on tetramethylthiuram disulphide, sold by the Company Akzo Chemicals;
(9) Ultraaccelerator based on zinc diethyldithiocarbamate, which activates the vulcanization by the thiazoles;
(10) Crosslinking agent;
(11) Silane A 189 organosilane, sold by the Company OSI.

Each composition is prepared in the following way:
The following operations are carried out in an internal mixer (Banbury type) rotating at 80 r/min:

| Time | Temperature | Operation |
|---|---|---|
| to | 60° C. | Introduction of the elastomers. |
| to + 1 min | 70° C. | Introduction of the silica, of the stearic acid, of the PEG 4000, of the calcined kaolin, of the zinc oxide, of the POS compound of formula (V-1) and of 70% by weight of the liquid paraffin. |
| to + 3 min | 105° C. | Introduction of the remaining 30% of the liquid paraffin and of the OS silicone compound (when one of them is used). |
| to + 7 min | 140° C. | Emptying of the mixer. |

The mixture obtained is then introduced onto a roll mill maintained at 30° C., in order to be calendered thereon. The MBT, the TMTD, the ZDEDC and the sulphur are introduced into this mill.

After homogenization and 3 finishing passes, the final mixture is calendered in the form of sheets with a thickness of 2.5 to 3 mm.

The results of the ageing tests in water (pure and containing washing powder), after vulcanization, are presented in the following Tables IV to VI; the vulcanization is carried out by bringing the mixtures to 160° C. for 10 minutes.

Ageing in water for 72 hours at 100° C.:

TABLE IV

| Properties | | Control 3 | Ex. 3 | Ex. 4 | Control 4 |
|---|---|---|---|---|---|
| Shore A hardness: | (1) | | | | |
| * before ageing | | 69 | 72 | 73 | 74 |
| * after ageing | | 72 | 74 | 74 | 75 |
| Swelling in water (increase in the weight in %) | | 2.3 | 1.6 | 0.9 | 1.7 |
| Decrease in the swelling (shown as % by weight): | | | | | |
| * Ex. 3 in comparison with Control 3 | | | −30.4 | | |
| * Ex. 4 in comparison with Control 3 | | | | −60.9 | |
| * Ex. 4 in comparison with Control 4 | | | | −47.1 | |

(1) The measurements are carried out according to the directions of ASTM standard D 3240.

Ageing in water, to which Omo washing powder has been added in the proportion of 10 g/liter, for 72 hours at 95° C.:

The washing powder used, Omo, is the strengthened formula provided for machine or hand washing sold in hypermarkets in the Lyons region.

This test of resistance to water containing washing powder is carried out according to the directions of MIELE standard MWN-TLF 2007, published in February 1984.

TABLE V

| Properties | | Control 3 | Ex. 3 | Ex. 4 | Control 4 |
|---|---|---|---|---|---|
| Shore A hardness: | (1) | | | | |
| * before ageing | | 69 | 72 | 73 | 74 |
| * after ageing | | 72 | 74 | 74 | 75 |
| Swelling in water (increase in the weight in %) | | 6.2 | 2.4 | 1.7 | 2.7 |
| Decrease in the swelling (shown as % by weight): | | | | | |
| * Ex. 3 in comparison with Control 3 | | | −61.3 | | |
| * Ex. 4 in comparison with Control 3 | | | | −81.5 | |
| * Ex. 4 in comparison with Control 4 | | | | −37.0 | |

Ageing in water, to which Ariel washing powder has been added in the proportion of 10 g/liter, for 72 hours at 60° C.:

The washing powder used, Ariel, is that provided for hand washing sold in hypermarkets in the Lyons region.

This test of resistance to water containing washing powder is carried out according to the directions of the above-mentioned MIELE standard.

TABLE VI

| Properties | | Control 3 | Ex. 3 | Ex. 4 | Control 4 |
|---|---|---|---|---|---|
| Shore A hardness: | (1) | | | | |
| * before ageing | | 69 | 72 | 73 | 74 |
| * after ageing | | 68 | 72 | 72 | 73 |
| Swelling in water (increase in the weight in %) | | 2.7 | 1.0 | 0.5 | 1.2 |

TABLE VI-continued

| Properties | Control 3 | Ex. 3 | Ex. 4 | Control 4 |
|---|---|---|---|---|
| Decrease in the swelling (shown as % by weight): | | | | |
| * Ex. 3 in comparison with Control 3 | | −63 | | |
| * Ex. 4 in comparison with Control 3 | | | −81.5 | |
| * Ex. 4 in comparison with Control 4 | | | −58.3 | |

EXAMPLES 5–7

These examples illustrate three identical elastomer compositions which are representative of other washing machine seal formulations, with the exception of the coupling agent which, in Examples 5 and 6, is the POS silicone compound corresponding to formula (V-1) and, in Example 7, is the combination of the said POS with the OS silicone compound consisting of vinyltris(2-methoxyethoxy)silane.

The preparation is carried out, in an internal mixer (Banbury type), of approximately 1 kg of each of the 5 mixtures for which the composition, expressed by weight, is shown in-the following Table VII:

TABLE VII

| Compositions | | Control 5 | Ex. 5 | Control 6 | Ex. 6 | Ex. 7 |
|---|---|---|---|---|---|---|
| EPDM 2504 | (1) | 100 | 100 | 100 | 100 | 100 |
| MgO | (2) | 2 | 2 | 2 | 2 | 2 |
| Stearic acid | (2) | 1 | 1 | 1 | 1 | 1 |
| DOP | (3) | 20 | 20 | 20 | 20 | 20 |
| Silica | (4) | 35 | 35 | 35 | 35 | 35 |
| Chalk, Omya BSH | (5) | 20 | 20 | 20 | 20 | 20 |
| Silitin V 85 | (6) | 30 | 30 | 30 | 30 | 30 |
| Perkadox 14/40 | (7) | 6 | 6 | 6 | 6 | 6 |
| POS of formula (V-1) | | 0 | 2 | 0 | 4 | 2 |
| Vinyltris(2-methoxy-ethoxy)silane | (8) | 0 | 0 | 2 | 0 | 2 |

(1) Ethylene-propylene-diene monomer elastomer, sold by the Company Esso Chimie under the name Vistalon 2504;

(2) Vulcanizing agent;

(3) Plasticizer based on dioctyl phthalate;

(4) Zeosil 1165 MP silica, sold by the Company Rhône-Poulenc Chimie;

(5) Natural surface-treated ground calcium carbonate, sold by the Company Omya;

(6) Filler, which is structurally composed of a natural agglomerate of granular quartz and lamellar kaolinite, sold by the Company Hoffmann Mineral;

(7) Crosslinking agent based on dicumyl peroxide (at 40% by weight on a silica substrate), sold by the Company Akzo;

(8) Silane sold by the Company OSI under the name Silane A 172.

Each composition is prepared in the following way:

The following operations are carried out in an internal mixer (Banbury type) rotating at 80 r/min:

| Time | Temperature | Operation |
|---|---|---|
| to | 60° C. | Introduction of the elastomer. |
| to + 1 min | 80° C. | Introduction of the silica, of MgO, of 70% by weight of the plasticizer, of the stearic acid and of the POS of formula (V-1). |
| to + 2 min | 95° C. | Introduction of the chalk and of the Silitin. |
| to + 3 min | 110° C. | Introduction of the remaining 30% of the plasticizer and of the OS silicone compound (when one of them is used). |
| to + 7 min | 140° C. | Emptying of the mixer. |

The mixture obtained is then introduced onto a roll mill maintained at 30° C., in order to be calendered thereon. The peroxide is introduced into this mill.

After homogenization and 3 finishing passes, the final mixture is calendered in the form of sheets with a thickness of 2.5 to 3 mm.

The results of the ageing tests in water (pure and containing washing powder), after vulcanization, are presented in the following Tables VIII to X; the vulcanization is carried out by bringing the mixtures to 160° C. for 12 minutes.

Ageing in water for 72 hours at 100° C.:

TABLE VIII

| Properties | | Control 5 | Ex. 5 | Control 6 | Ex. 6 | Ex. 7 |
|---|---|---|---|---|---|---|
| Shore A hardness: | (1) | | | | | |
| * before ageing | | 69 | 68 | 73 | 68 | 72 |
| * after ageing | | 68 | 69 | 74 | 69 | 73 |
| Swelling in water (increase in the weight in %) | | 3.5 | 1.3 | 0.9 | 0.8 | 0.7 |
| Decrease in the swelling (shown as % by weight): | | | | | | |
| * Ex. 5 in comparison with Control 5 | | | −62.9 | | | |
| * Ex. 6 in comparison with Control 5 | | | | | −77.1 | |
| * Ex. 7 in comparison with Control 5 | | | | | | −80 |
| * Ex. 7 in comparison with Control 6 | | | | | | −22.2 |

(1) The measurements are carried out according to the directions of ASTM standard D 3240.

Ageing in water, to which Omo washing powder has been added in the proportion of 10 g/liter, for 72 hours at 95° C.:

The washing powder is that used in Examples 3 and 4.

This test of resistance to water containing washing powder is carried out according to the directions of the above-mentioned Miele standard in its examples.

TABLE IX

| Properties | Control 5 | Ex. 5 | Control 6 | Ex. 6 | Ex. 7 |
|---|---|---|---|---|---|
| Shore A hardness: (1) | | | | | |
| * before ageing | 69 | 68 | 73 | 68 | 72 |
| * after ageing | 68 | 69 | 74 | 69 | 72 |
| Swelling in water (increase in the weight in %) | 6.3 | 2.7 | 2.2 | 1.3 | 1.2 |
| Decrease in the swelling (shown as % by weight): | | | | | |
| * Ex. 5 in comparison with Control 5 | | −57.1 | | | |
| * Ex. 6 in comparison with Control 5 | | | | −79.3 | |
| * Ex. 7 in comparison with Control 5 | | | | | −80.9 |
| * Ex. 7 in comparison with Control 6 | | | | | −45.4 |

Ageing in water, to which Ariel washing powder has been added in the proportion of 10 g/liter, for 72 hours at 60° C.:
The washing powder is that used in Examples 3 and 4.
This test of resistance to water containing washing powder is carried out according to the directions of the above-mentioned Miele standard in its examples.

TABLE X

| Properties | Control 5 | Ex. 5 | Control 6 | Ex. 6 | Ex. 7 |
|---|---|---|---|---|---|
| Shore A hardness: (1) | | | | | |
| * before ageing | 69 | 68 | 73 | 68 | 72 |
| * after ageing | 64 | 67 | 72 | 67 | 71 |
| Swelling in water (increase in the weight in %) | 6.8 | 1.8 | 1.4 | 0.6 | 0.8 |
| Decrease in the swelling (shown as % by weight): | | | | | |
| * Ex. 5 in comparison with Control 5 | | −73.5 | | | |
| * Ex. 6 in comparison with Control 5 | | | | −91.2 | |
| * Ex. 7 in comparison with Control 5 | | | | | −88.2 |
| * Ex. 7 in comparison with Control 6 | | | | | −42.8 |

What is claimed is:

1. A method for improving the mechanical properties of an elastomeric material which contain siliceous particles having hydroxylated surface sites as a reinforcing filler comprising the steps of:
   a) mixing said elastomeric material with a silicone composition comprising the combination of:
      at least one polyorganosiloxane (POS) containing, per molecule, at least one siloxy unit (UN1) capable of binding chemically or physically with the hydroxylated surface sites of the siliceous particles; and
      at least one organosilane (OS) containing, per molecule, at least one group (G1) capable of binding chemically or physically with the UN1 siloxy units or the hydroxylated surface sites of the siliceous particles, and at least one group (G2) capable of binding chemically or physically to the elastomeric material; said elastomeric material being:
      (1) a homopolymer obtained by polymerization of a conjugated diene monomer having from 4 to 22 carbon atoms;
      (2) a copolymer obtained by copolymerization of one or a number of the abovementioned conjugated dienes with one another or with one or a number of ethylenically unsaturated monomers selected from the group consisting of vinylaromatic monomers having from 8 to 20 carbon atoms, vinyl nitrile monomers having from 3 to 12 carbon atoms, and acrylic ester monomers derived from acrylic acid or from methacrylic acid with alkanols having from 1 to 12 carbon atoms;
      (3) a copolymer obtained by copolymerization of ethylene with an α-olefin having from 3 to 6 carbon atoms;
      (4) a ternary copolymer obtained by copolymerization of ethylene and an α-olefin having 3 to 6 carbon atoms with a non-conjugated diene monomer having from 6 to 12 carbon atoms;
      (5) a natural rubber;
      (6) a copolymer obtained by copolymerization of isobutene and isoprene (butyl rubber) and the halogenated versions of these copolymers;
      (7) a mixture of a number of the above-mentioned elastomers (1) to (6) with one another;
      (8) a chlorosulphonated polyethylene;
      (9) a fluorinated hydrocarbon; or
      (10) a polyepichlorohydrin; and
   b) recovering said elastomeric material.

2. The method according to claim 1, wherein the POS silicone compounds are:
   (A) compounds comprising, per molecule:
      at least one functional siloxy unit (UN1) of formula:

(I) $(R)_a Y Si(O)_{3-a_2}$ 

wherein:
      a=0, 1 or 2,
      R is a linear alkyl having from 1 to 6 atoms, a branched alkyl having from 1 to 6 atoms or an aryl, the R radicals being identical or different when a=2,
      Y is a linear or branched $C_1$–$C_{15}$ alkoxy, and at least one functional siloxy unit of formula:

(II) $(R)_b W Si(O)_{3-b_2}$ 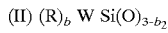

wherein:
      b=0, 1 or 2,
      R corresponds to the same definition as that given above for the R substituent of the unit (I) and is identical to or different from the latter,
      W is a monovalent hydrocarbon radical having from 2 to 30 carbon atoms and, optionally, S or O atoms and constituting a functional group connected to the silicon via a Si-C bond,
   this group being:
      (i) a linear or branched alkyl group comprising at least 7 carbon atoms,
      (2i) a linear or branched $C_2$–$C_{20}$ alkenyl group containing one or a number of double bonds in the chain(s) or at the end(s) of chain(s),
      (3i) an unsaturated mono- or bicyclic aliphatic group containing 5 to 20 cyclic carbon atoms and one or two ethylenic double bond(s) in the ring, which double bond(s) is/are optionally substituted by one or two linear or branched $C_1$–$C_3$ alkyl group(s), optionally connected to the silicon via a linear or branched $C_2$–$C_{10}$ alkylene radical, and
   optionally, at least one siloxy unit (III) of formula:

(III) $(R)_c (H)_d Si(O)_{4-(c+d)_2}$ 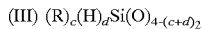

wherein:
c=0, 1, or 2, d=1 and c+d≦3,
the R substituents being as defined above in the units (I) and (II);
(B) compounds of formula (IV):

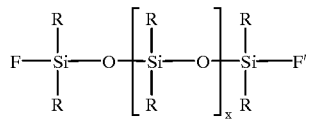
(IV)

wherein:
the R symbol corresponds to the same definition as that of R given above in the key of the formula (I), the R radicals being identical to or different from one another,
x=0 to 1,000,
F and F' are hydrogen, halogens, those corresponding to the definition of R, hydroxyl, alkoxy, enoxy, acyloxy, oxime and amine functional groups, F and F' being different or identical with the further proviso that, in the case where F is identical to F', it cannot be the R radical; or
(C) hydroxylated or alkoxylated silicone resins exhibiting, per molecule, at least 2 different units of formula: $R'_3SiO_{0.5}$ (M), $R'_2SiO$ (D), $R'SiO_{1.5}$ (T) and $SiO_2$ (Q), at least one of these units being a T or Q unit, the R' radicals, which are identical or different, being a linear $C_1$–$C_6$ alkyl radical, a branched $C_1$–$C_6$ alkyl radical, the vinyl radical, the phenyl radical and the 3,3,3-trifluoro-propyl radical and having a content by weight of hydroxyl or alkoxy groups of between 0.1 and 10%.

3. The method according to claim 2, wherein the W substituent of the unit (II) is:
an alkyl radical (i) comprising from 8 to 30 carbon atoms,
a $C_6$–$C_{10}$ radical (2i) containing a double bond and optionally another conjugated to the first, or
a monocyclic $C_5$–$C_6$ radical (3i), optionally connected to the silicon via a linear or branched $C_2$–$C_6$ alkylene radical.

4. The method according to claim 3, wherein the polyorganosiloxanes (A) are of following average formula:

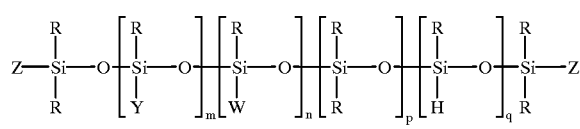
(V)

wherein:
the Y, W and R symbols are as defined in claim 3,
the Z symbol is hydrogen R, Y or W,
the sum m+n+p+q≧3,
0≦m≦100,
0≦n≦100,
0≦p≦20,
0≦q≦40,
with the further proviso that:
if m=0, at least one of the Z substituents is Y,
if n=0, at least one of the Z substituents is W, and, if m=n=0 and p+q≧1, then one of the Z substituents is Y and the other of the Z substituents are W.

5. The method according to claim 4, wherein p=q=0 and 0.1≦m/n≦5.

6. The method according to claim 2, wherein the polyorganosiloxanes (A) are cyclic copolymers of following average formula:

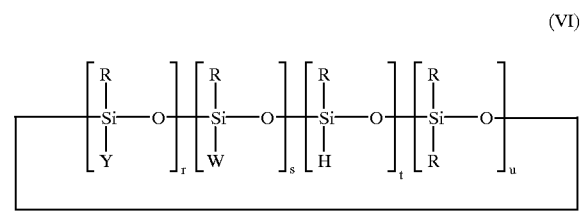
(VI)

wherein Y, W and R are as defined in claim 2 and with r, s, t and u representing integers or positive decimals:
the sum r+s+t+u≧3,
1≦r≦8,
1≦s≦8,
0≦t≦8,
0≦u≦8.

7. The method according to claim 1, wherein step a) comprising:
combining at least one POS silicone compound with at least one OS silicone compound, and, then, adding the elastomeric material comprising the siliceous filler, or alternatively
adding at least one POS silicone compound and at least one OS silicone compound, to the elastomeric material comprising the siliceous filler.

8. The method according to claim 1, wherein at least one POS silicone compound is reacted with the siliceous filler before incorporating the siliceous particles in the elastomeric material.

9. The process according to claim 1, wherein the OS silicone compounds are:
OS of formula (IX)

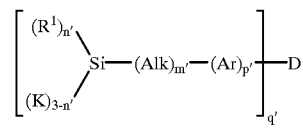

wherein:
$R^1$ represents an alkyl group containing 1 to 10 carbon atom(s) or a phenyl radical,
K represents:
a halogen,
an alkoxy, a cycloalkoxy radical, or
an acyloxy radical 0≦n≦2;
Alk represents a divalent linear or branched alkylene having from 1 to 10 atoms, optionally substituted by a $C_6$–$C_{12}$ aryl radical;
m' represents 0 or 1,
Ar represents an aryl group having from 6 to 12 atoms,
p' represents 0 or 1, with the further proviso that p' and m' are not simultaneously equal to 0, q'=1 or 2, D represents:

if q'=2, a polysulphide group of the formula:
—Sx—
with $1 \leq x \leq 8$;

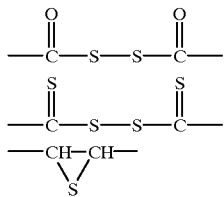

if q'=1, a group of the formula:

—SH

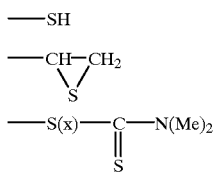

with $1 \leq x \leq 8$

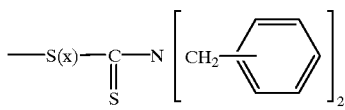

with $1 \leq x \leq 8$

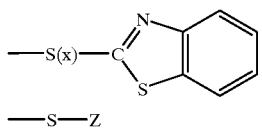

—S—Z with $1 \leq x \leq 8$ and Z being a halogen,

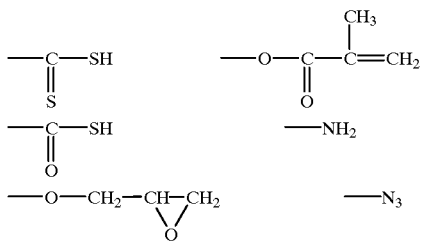

OS of formula (XI)

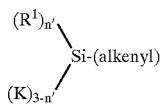

wherein:

$R^1$ and K correspond to the same definition as that given above in the key of the formula (IX), $0 \leq n' \leq 2$, alkenyl represents a cyclic or non-cyclic, linear or branched hydrocarbon group, containing one or a number of double bonds, having from 2 to 20 carbon atoms; or

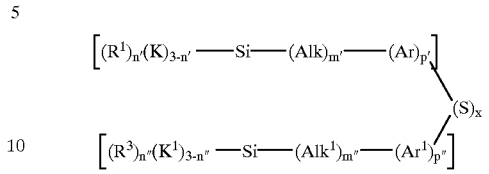

wherein:

the $R^1$ and $R^3$ symbols are identical or different and correspond to the same definition as that of $R^1$ above given in formula (IX), K and $K^1$ are identical or different and correspond to the same definition as that of K above given in formula (IX), the x symbol is a positive integer between 1 and 8, $(S)_x$ thus representing a polysulphide radical, the Alk and $Alk^1$ symbols are identical or different and correspond to the same definition as that of Alk above given in formula (IX), the n' and n" symbols are identical or different and correspond to the same definition as that of n' above given in formula (IX), the m' and m" symbols are identical or different and correspond to the same definition as that of m' above given in formula (IX), the Ar and $Ar^1$ symbols are identical or different and correspond to the same definition as that of Ar above given in formula (IX), the p' and p" symbols are identical or different and correspond to the same definition as that of p' above given in formula (IX), with the further proviso of not simultaneously having n'=n", m'=m", p'=p", K=$K^1$, $R^1$=$R^3$, Alk=$Alk^1$ and Ar=$Ar^1$.

10. The process according to claim 9, wherein the OS silicone compounds are mercaptosilanes of formula (IX), bis[tri($C_1$–$C_4$ alkoxy)silylpropyl] tetrasulphides of formula (IX), or tri($C_1$–$C_6$ alkoxy)alkenylsilanes of formula (XI).

11. The process according to claim 1, wherein the OS silicone compounds are:

OS of formula (X)

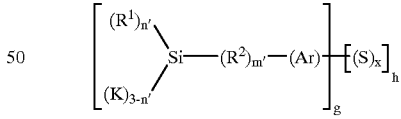

wherein:

$R^1$ represents an alkyl group containing 1 to 10 carbon atom(s) or a phenyl radical, K represents:
 a halogen,
 an alkoxy, a cycloalkoxy radical, or
 an acyloxy radical, $0 \leq n' \leq 2$, $R^2$ represents a divalent hydrocarbon group chosen from linear or branched alkylenes and alkylenoxys having from 1 to 10 carbon atom(s), m' represents 0 or 1, Ar represents a hydrocarbon group chosen from aryls having from 6 to 12 carbon atoms, $(S)_x$ is a divalent polysulphide radical, each free valency being directly bonded to a carbon atom of an aromatic ring, $2 \leq x \leq 6$ $g \geq 2$ and $h \geq 1$ with $0.4 \leq g/h \leq 2$.

12. An elastomeric material, comprising:
  (a) 100 parts of an elastomeric material, said elastomeric material being:
     (1) a homopolymer obtained by polymerization of a conjugated diene monomer having from 4 to 22 carbon atoms;
     (2) a copolymer obtained by copolymerization of one or a number of the above mentioned conjugated dienes with one another or with one or a number of ethylenically unsaturated monomers selected from the group consisting of vinylaromatic monomers having from 8 to 20 carbon atoms, vinyl nitrile monomers having from 3 to 12 carbon atoms, and acrylic ester monomers derived from acrylic acid or from methacrylic acid with alkanols having from 1 to 12 carbon atoms;
     (3) a copolymer obtained by copolymerization of ethylene with an α-olefin having from 3 to 6 carbon atoms;
     (4) a ternary copolymer obtained by copolymerization of ethylene and an α-olefin having 3 to 6 carbon atoms with a non-conjugated diene monomer having from 6 to 12 carbon atoms;
     (5) a natural rubber;
     (6) a copolymer obtained by copolymerization of isobutene and isoprene (butyl rubber) and the halogenated versions of these copolymers;
     (7) a mixture of a number of the above-mentioned elastomers (1) to (6) with one another;
     (8) a chlorosulphonated polyethylene;
     (9) a fluorinated hydrocarbon; or
     (10) a polyepichlorohydrin;
  (b) 10 to 100 parts by weight of siliceous filler particles,
  (c) 0.15 to 15 parts by weight of polyorganosiloxane (POS), containing, per molecule, at least one siloxy unit (UN1) capable of binding chemically or physically with the hydroxylated surface sites of the siliceous particles; and
  (d) 0.2 to 8 parts by weight of organosilane (OS) containing, per molecule, at least one group (G1 capable of binding chemically or physically with the UN1 siloxy units or the hydroxylated surface sites of the siliceous particles, and at least one group (G2) capable of binding chemically or physically to the elastomeric material.

13. The elastomeric material according to claim 12, wherein the siliceous filler is a highly dispersible precipitated silica having a BET specific surface $\leq 450$ m²/g and a CTAB specific surface $\leq 450$ m²/g.

14. The elastomeric material according to claim 13, wherein the silica has a BET specific surface/CTAB specific surface ratio $\geq 1$ and $\leq 1.2$.

15. The elastomeric material according to claim 7, wherein said elastomer is polybutadiene, polychloroprene, polyisoprene, poly(styrene-butadiene), poly(acrylonitrile-butadiene), poly(styrene-butadiene-isoprene), an ethylene/propylene/non-conjugated diene monomer terpolymer, or a butyl rubber.

16. The elastomeric material according to claim 12, further comprising one or more auxiliary additives.

17. A composition of matter comprising:
  (1) an elastomeric material said elastomeric material being:
    a homopolymer obtained by polymerization of a conjugated diene monomer having from 4 to 22 carbon atoms;
    a copolymer obtained by copolymerization of one or a number of the above mentioned conjugated dienes with one another or with one or a number of ethylenically unsaturated monomers selected from the group consisting of vinylaromatic monomers having from 8 to 20 carbon atoms, vinyl nitrile monomers having from 3 to 12 carbon atoms, and acrylic ester monomers derived from acrylic acid or from methacrylic acid with alkanols having from 1 to 12 carbon atoms;
    a copolymer obtained by copolymerization of ethylene with an α-olefin having from 3 to 6 carbon atoms;
    a ternary copolymer obtained by copolymerization of ethylene and an α-olefin having 3 to 6 carbon atoms with a non-conjugated diene monomer having from 6 to 12 carbon atoms;
    a natural rubber;
    a copolymer obtained by copolymerization of isobutene and isoprene (butyl rubber) and the halogenated versions of these copolymers;
    a mixture of a number of the above-mentioned elastomers (1) to (6) with one another;
    a chlorosulphonated polyethylene;
    a fluorinated hydrocarbon; or
    a polyepichlorohydrin;
  (2) siliceous filler particles; and
  (3) a coupling agent comprising at least one polyorganosiloxane (POS) containing, per molecule, at least one functional siloxy unit (UNI) capable of binding chemically or physically with the hydroxylated surface sites of the silica particles; and at least one organosilane (OS) containing, per molecule, at least one group (G1 capable of binding chemically or physically with the UN1 siloxy units or the hydroxylated surface sites of the siliceous particles, and at least one group (G2) capable of binding chemically or physically to the elastomeric material;
  and wherein component (3) is coated onto component (2).

18. Engine supports, components of vehicle caterpillar tracks, shoe soles, rollers for cableways, seals for domestic electrical appliances or cable sheathings comprising a composition according to claim 17.

* * * * *